United States Patent
Houmb

(10) Patent No.: US 10,078,317 B2
(45) Date of Patent: Sep. 18, 2018

(54) METHOD, DEVICE AND COMPUTER PROGRAM FOR MONITORING AN INDUSTRIAL CONTROL SYSTEM

(71) Applicant: Secure-NOK AS, Stavanger (NO)

(72) Inventor: Siv Hilde Houmb, Houston, TX (US)

(73) Assignee: Secure-NOK AS, Stavanger (NO)

( * ) Notice: Subject to any disclaimer, the term of this patent is extended or adjusted under 35 U.S.C. 154(b) by 250 days.

(21) Appl. No.: 14/440,128

(22) PCT Filed: Jan. 7, 2014

(86) PCT No.: PCT/NO2014/050001
§ 371 (c)(1),
(2) Date: May 1, 2015

(87) PCT Pub. No.: WO2014/109645
PCT Pub. Date: Jul. 17, 2014

(65) Prior Publication Data
US 2015/0301515 A1    Oct. 22, 2015

Related U.S. Application Data

(60) Provisional application No. 61/750,169, filed on Jan. 8, 2013.

(51) Int. Cl.
*G06F 11/00* (2006.01)
*G06F 12/14* (2006.01)
(Continued)

(52) U.S. Cl.
CPC ....... *G05B 19/0428* (2013.01); *G05B 19/406* (2013.01); *G06F 21/552* (2013.01);
(Continued)

(58) Field of Classification Search
None
See application file for complete search history.

(56) References Cited

U.S. PATENT DOCUMENTS 7,752,301 B1 * 7/2010 Maiocco ............... G06F 15/173
709/224
7,761,912 B2 * 7/2010 Yee ..................... H04L 63/0263
726/11

(Continued)

FOREIGN PATENT DOCUMENTS

EP    2657880 A1    10/2013
EP    2660674 A2    11/2013
(Continued)

OTHER PUBLICATIONS

Briesemeister, L. et al., "Detection, correlation, and visualization of attacks against critical infrastructure systems", published in Eighth Annual International Conference on Privacy Security and trust, IEEE, Piscataway, NJ, USA, XP031769460, Aug. 17, 2010.

(Continued)

*Primary Examiner* — Morshed Mehedi
*Assistant Examiner* — Vadim Savenkov
(74) *Attorney, Agent, or Firm* — Andrus Intellectual Property Law, LLP

(57) ABSTRACT

A method is for monitoring an industrial control system. The method comprises collecting data from one or more sources external to the industrial control system; collecting data from one or more internal sources on the industrial control system; aggregating data collected from said internal sources or from said external sources; correlating said collected data by analyzing and interpreting said collected data in view of previously collected data so as to monitor the security of the industrial control system. An apparatus is for performing the method.

11 Claims, 8 Drawing Sheets

(51) Int. Cl.

| | |
|---|---|
| *G06F 12/16* | (2006.01) |
| *G08B 23/00* | (2006.01) |
| *G05B 19/042* | (2006.01) |
| *G06F 21/55* | (2013.01) |
| *H04L 29/06* | (2006.01) |
| *G05B 19/406* | (2006.01) |
| *G06Q 10/06* | (2012.01) |
| *G06Q 50/26* | (2012.01) |
| *H04L 12/24* | (2006.01) |
| *G05B 23/02* | (2006.01) |

(52) U.S. Cl.
CPC ............ *G06Q 10/06* (2013.01); *G06Q 50/26* (2013.01); *H04L 41/0631* (2013.01); *H04L 63/1425* (2013.01); *H04L 63/1433* (2013.01); *G05B 23/0229* (2013.01); *G05B 2219/14006* (2013.01); *G05B 2219/14076* (2013.01); *G06F 2221/2153* (2013.01)

(56) References Cited

U.S. PATENT DOCUMENTS

| | | | | |
|---|---|---|---|---|
| 8,234,706 | B2* | 7/2012 | Zhang | G06Q 10/00 707/706 |
| 8,401,710 | B2* | 3/2013 | Budhraja | H02J 3/008 700/291 |
| 2004/0003286 | A1 | 1/2004 | Kaler et al. | |
| 2005/0138120 | A1* | 6/2005 | Gundersen | H04L 29/06 709/204 |
| 2007/0134705 | A1* | 6/2007 | Jung | G06F 19/20 435/6.16 |
| 2011/0288692 | A1* | 11/2011 | Scott | G06F 21/55 700/297 |
| 2012/0224057 | A1 | 9/2012 | Gill et al. | |
| 2013/0081103 | A1 | 3/2013 | Uner et al. | |
| 2013/0037682 | A1 | 11/2013 | Wang et al. | |
| 2013/0298192 | A1 | 11/2013 | Kumar et al. | |
| 2013/0307682 | A1 | 11/2013 | Jerhotova et al. | |

FOREIGN PATENT DOCUMENTS

| | | |
|---|---|---|
| WO | 2004111785 A2 | 12/2004 |
| WO | 2009128905 A1 | 10/2009 |
| WO | 2011146284 A3 | 11/2011 |

OTHER PUBLICATIONS

International Preliminary Report on Patentability for PCT/NO2014050001 dated Feb. 24, 2015.

International Search Report and Written Opinion for PCT/NO2014050001 dated Apr. 2, 2014.

Ralph Langer, To Kill a Centrifuge, A Technical analysis of What Stuxnet's Creators Tried to Achieve, http://www.langner.com/en/wp-content/uploads/2013/11/To-kill-a-centrifuge.pdf.

Siv Hilde Houmb, Virginia N.L. Franqueira and Erlend Agøy Engum. Estimating Impact and Frequency of Risks to Safety and Mission Critical Systems Using CVSS. In: ISSRE 2008 Supplemental Proceedings: 1st Workshop on Dependable Software Engineering, Nov. 11, 2008, Seattle, US, 6 pag-es, IEEE CS Conference Proceedings, IEEE Computer Society Press, Seattle, US, Nov. 2008. ISBN 978-1-4244-3417-6.

Siv Hilde Houmb, Virginia N. L. Franqueira, Erlend Agoy Engum. Quantifying security risk level from CVSS estimates of frequency and impact. Journal of Systems and Software 83(9): 1622-1634 (2010).

Siv Hilde Houmb, Indrakshi Ray, Indrajit Ray, and Sudip Chakraborty. Trust-Based Security Level Evaluation Using Bayesian Belief Networks. In: M.L. Gavrilova et al. (Eds.): Trans. on Comput. Sci. X, LNCS 6340, pp. 154-186 (2010). Springer-Verlag Berlin Heidelberg 2010.

Siv Hilde Houmb, Sudip Chakraborty, Indrakshi Ray, Indrajit Ray. Using Trust-Based Information Aggregation for Predicting Security Level of Sys-tems. In: DBSec 2010, pp. 241-256, 2010.

Written Opinion for PCT/NO2014050001 dated Nov. 17, 2014.

* cited by examiner

METHOD, DEVICE AND COMPUTER PROGRAM FOR MONITORING AN INDUSTRIAL CONTROL SYSTEM

CROSS-REFERENCE TO RELATED APPLICATIONS

This application is the U.S. national stage application of International Application PCT/NO2014/050001, filed Jan. 7, 2014, which international application was published on Jul. 17, 2014 as International Publication WO2014/109645 in the English language. The international application is incorporated herein by reference, in entirety. The international application claims priority to U.S. Patent Application No. 61/750,169, filed Jan. 8, 2013, which is incorporated herein by reference, in entirety.

FIELD

The invention relates to a method for monitoring an industrial control system. More specifically, the invention relates to a method wherein data is collected from both internal sources in/on the industrial control system and from sources external to the industrial control system, and wherein the collected data is compared to previously obtained data to monitor the security of the industrial control system. The invention also relates to an apparatus for performing the method, and to a computer program for executing the steps of the method.

BACKGROUND

In the following description, references made to other publications are indicated with numerals enclosed in square brackets, whereby relevant text of such mentioned references are included as part of this disclosure as they provide technical information that a skilled person in the art could find useful for understanding the background for particulars of this invention. The list of references is given at the end of this document.

Security attacks, particularly the new industrial-targeted attacks or Advanced Persistent Threats (APT), such as exemplary Stuxnet, have the potential of espionage, sabotage, stopping or delaying operations and fabricating information. Furthermore, such security attacks may have the capability to significantly damage or even take down industrial control systems (ICSs), relevant networks and systems. Industrial control systems are used in a variety of industries, such as in electrical, water, oil, gas and data industries, though the invention should not be construed as limited to this non-exhaustive list.

The industrial-targeted security attacks Stuxnet, discovered in 2010, and Flame, discovered in 2012, represent a paradigm shift for security attacks. The new security attacks target industrial systems, such as ICSs, and are difficult to detect. For example, it is believed that Flame operated for several years before it was discovered. Controls, operational and production systems are the prey of the new security attacks, possibly leading to stop in operations or destruction of equipment or other incidents. The implications of such a security attack may be catastrophic. Details on how Stuxnet caused massive destructions in the Iranian power plant Natanz are described in reference [6].

The security attack Flame was a sophisticated espionage software, and similar malicious software might infiltrate ICSs in a vast amount of industries relying on control systems. Another significant security concern is sabotage malware; software programmed to slowly destroy a control system, specific controllers or part of a system. Sabotage malware might lead to abnormal activity and malfunction that are hard to detect.

Some known control systems may have security events and anomalistic events detection capabilities. However, known systems may not detect industrial targeted attacks or previously unknown security events, zero-days attacks and otherwise unknown or unrecognizable security-relevant events.

SUMMARY

The object of the invention is to remedy or to reduce at least one of the disadvantages of the prior art, or at least to provide a useful alternative to the prior art.

The object is achieved by virtue of features disclosed in the following description and in the subsequent claims.

In the following a software agent shall mean a persistent, goal-oriented computer program that reacts to its environment and runs without continuous direct supervision to perform a function on behalf of an end user or another program.

Sensor shall mean a device that detects and responds to input from the physical environment.

Entity shall be defined as any hardware or software of an industrial control system.

Operation shall mean a job or task consisting of one or more elements or subtasks performed inside of a specific entity including specific software component, machine, equipment or similar.

Instruction shall mean a single operation of a processor defined by an instruction set to the processor.

Database shall mean any searchable format of data and information.

Confidentiality shall mean that Information is made available or disclosed only to authorized individuals, entities or processes.

Integrity shall mean that information is not destroyed or altered in an unauthorized manner, and that the system performs its intended function in an unimpaired manner free from deliberate or accidental unauthorized manipulation of the system.

Availability shall mean that system services are accessible and usable on demand by an authorized entity.

Authenticity shall mean that the identity of a subject or resource is the one claimed.

Accountability shall mean that actions of an entity and/or a system user may be traced uniquely to the entity and/or system user.

Non-repudiation shall be defined as the ability to prove that an action or event has taken place in order to prevent later repudiation of this event or action.

Reliability shall be defined as the ability of an item to perform a required function under stated conditions.

In a first aspect the invention relates to a method for monitoring an industrial control system, the method comprising the following steps:
  collecting data from one or more sources external to the industrial control system;
  collecting data from one or more internal sources on the industrial control system;
  aggregating data collected from said internal sources and/or from said external sources; and correlating said collected data by analyzing and interpreting said collected data in view of previously collected data so as to monitor the security of the industrial control system.

By previously collected data is meant data collected at any time prior to said correlation. It may be in the order of sub-seconds, seconds, minutes, days or years in advance.

In one embodiment the step of collecting data from one or more sources external to the industrial control system may include collecting data from one or more of the following sources:

security blogs and the like;
security discussion sources and the like;
databases, such as the National Vulnerability Database (NVD);
security evaluation and severity information such as the Common Vulnerability Scoring System (CVSS);
standards, standardization bodies, security best practices, security agencies; and
information from security software solution providers.

In use the method according to the invention may collect data from several hundred external sources. The external sources, and the collection of data therefrom, are described more in detail below.

In one embodiment the step of collecting data from one or more internal sources on the industrial control system may include collecting data from one or more of the following sources:

a sensor;
an agent;
a recording means adapted to record data from instructions, operations, procedures and/or security events locally on the industrial control system.

Sensors are physical devices as defined above. Agents are software with specific functions as defined above, while other recording means may be incorporated into the industrial control system or as an addition to operating systems, firmware or similar.

The internal sources and the collection of data therefrom are described in more detail below.

In one embodiment the step of aggregating data may include aggregating data from said internal sources in one or more of the following steps:

parameterized aggregation;
layer-wise aggregation; and
cross-layer aggregation.

Aggregation of data from internal sources may be done in several ways. In the following three specific examples of aggregation of data collected from internal sources are given: (i) parameterized aggregation, (ii) layer-wise aggregation and (iii) cross-layer aggregation.

Parameterized Aggregation:

Agents, sensors or other recording means record various parameters, such as CPU usage, USB insertion, processes running locally on a machine, applications, network interface activities, Application Programming Interface (API) activities etc. The various parameterized data are aggregated over a specific period of time, where the time period may be configurable in the system using a configurations module which will be described more in detail below. As an example, CPU usage may be continuously monitored and reported and/or recorded according to specific time intervals such as every 10 seconds, but the time intervals may be shorter or longer, depending on the specific application. The CPU usage records may then be aggregated to obtain an estimated CPU usage graph based on the available data points. For some systems, where recording cannot be done continuously, it may be necessary to do approximation based on whatever data set that is available. The same goes for all the other parameters. Industrial control systems may have equipment, machines or other entities that do not permit continuous monitoring due to limited resource capabilities and capacity. Such equipment might already operate on its capacity limits. In such cases it is important with non-intrusive monitoring and recording, i.e. recording is done whenever there is available capacity. Aggregation of recordings and Information may be performed over a specific time interval or according to specific time slots. Aggregation is performed per parameter over the specific time interval. The mentioned configurations module may be used to configure monitoring and reporting from the agent and features inside of an aggregation, correlation and interpretation module that will also be described more in detail below.

Layer-wise Aggregation:

Aggregation may be performed per layer for one entity (equipment, machine, component, etc.). As an example, a machine may be segregated into seven layers (according to the International Organization for Standardization (ISO) Open Systems Interconnection (OSI) model (ISO/TEC 7498-1)) and monitoring and reporting may be performed on various numbers of these layers depending on the type of entity that is being monitored. In this case, monitoring and aggregating are performed per layer and data from the different parameters are aggregated per layer. The layers are: physical, link layer, network, transport, session, presentation and application.

Cross-layer Aggregation:

Performing cross-layer aggregation means to aggregate data cross the layers inside of one entity to see if what is observed on one layer, such as a physical layer, is the same as what is observed on the other layers, like network and application layers. As an example, an application that runs as a process makes use of various resources and generates a specific amount of CPU usage and network traffic, which should be reflected on all layers. The network traffic sent from the application layer is processed on the lower layers and translated, and should thus represent the expected and relevant activity on each layer. This information may then be aggregated into one "scenario" or activity list. This cross-layer aggregation is done to detect attacks that operate in lower layers or that operate across layers in the machine or protocol stack, such as Stuxnet-like attacks.

In one embodiment the step of aggregating data may include aggregating data from said external sources by means of the steps of:

reformatting data collected from said external sources; and
aggregating said reformatted data into a database.

Aggregating data from external sources may be done a little differently than the above-described aggregation of internal data. External sources come in various formats and abstraction layers and need to be aligned, i.e. reformatted, before they can be aggregated. For example, data can be information on a new virus and detailed description of the virus. The aggregation of external data may be performed manually or automated or semi-automated. One possibility for automated aggregation of external data is the aggregation based on identifiers. For example, a vulnerability is assigned a specific identifier, which is used by a vendor of a product with the identified vulnerability, in the National Vulnerability Database (NVD), in detailed descriptions of the virus, in discussions of the virus, in solutions or countermeasures or work-around of the virus, etc. The aggregated data may be collected to gather information on one security attack or vulnerability in one database. Further details about aggregation of data, both from internal and external sources are given in references [1-3].

In one embodiment the step of correlating said aggregated data may include one or more of the following steps:
- correlating across parameters;
- correlating across layers;
- correlating across entities in a system; and
- correlating across systems.

Data may preferably be aggregated before it is correlated. Correlation means to compare and to evaluate data against each other, across equipment, across systems, across operation or production sites, such as drilling rigs or oil production platforms, etc. Data can also be correlated across layers and across parameters. The four above-mentioned types of correlations may be referred to as: parameterized correlation, local correlation, system correlation and global correlation. Correlation is done by taking e.g. CPU data and compare it with data on a critical process for the same period, compare these and generate two graphs; one for CPU data and one for critical processes and comparing these and then correlating them into one graph or similar representing both data streams. The same process is repeated per parameter that is correlated. Eventually, data may be correlated into an interval graph giving a holistic overview of the events happening within one specific time period. Correlation may be performed on various levels for the four types of correlation. For example, correlation for a system across equipment may be performed on a system basis (more abstracted level than for parameterized local correlation) and can be done by looking into correlated parameterized data from each equipment and compare the data to look for similarities. An example is to evaluate whether or not the same activity is being observed on multiple equipment. This way is it possible to determine the type of attack and whether it is spreading and how it is spreading.

In one embodiment the step of correlating said aggregated data may include the step of determining a security risk from any detected security event by means of one or more of the following sub-steps:
- evaluating said aggregated data by comparing to a predefined threshold value;
- evaluating said aggregated data by comparing to a relevant installation baseline, performance baseline and/or entity configuration baseline such as a machine or equipment baseline to identify abnormal activity;
- evaluating said aggregated data by comparing to a past events database;
- evaluating said aggregated data by comparing to a knowledge, experience and recommendations database obtained from a collection of standards and best practices and from external sources; and
- evaluating said aggregated data by comparing to security events reports from one or more external and/or internal sources.

Security attack scenarios may thus be developed from any detected security-relevant event based on correlated, aggregated, observed data. The aggregated data may be interpreted by means of any of the steps listed above, such as by comparing to information, experience and knowledge that have been gathered a priori to develop attack scenarios and interpret the observations made by means of determining what kind of security attack it might be and that is being seen on an industrial control system and/or specific entities of a system. This can be regarded as a step-wise procedure where aggregated and correlated data first are compared to defined thresholds, baseline, past events, etc. For example, if the CPU usage is above a certain threshold, defined to be normal or expected, an increased CPU usage may be an indication that there is un-expected activity on an entity such as a machine, such as reading of files which may be an indication of industrial espionage. If there are other files or processes running than what are defined as part of the Installation base, this might be an indication of malware. If additional activity is observed on the network interface, this might indicate that the malware is sending information out of the machine. If the events data are similar to data observed earlier and/or data observed on other machines, this may indicate that there is an APT that is starting to become active or that an attack is spreading to more machines. If the data are similar to data observed by other systems or reported in an external source, such as a news group, this may be used to determine the type of attack. From the latter rule-sets from previous experience, standards or best practices may also be developed. Last but not least, the data can be compared with e.g. data on attacks gathered and aggregated from external sources, such as NVD.

In one embodiment the method further comprises the step of reacting to a security risk by means of one or more of the following actions:
- repairing immediately;
- scheduling a repair;
- delaying the repair; or
- doing nothing.

The action to be taken may be decided autonomously, semi-autonomously or manually.

A method according to the present invention may be tailored to handle the above-mentioned challenges and drawbacks of the prior art, and may detect espionage, various types of sabotage, manipulation, and other security-relevant events early in an attack process, before any harm is done to the industrial control system. Furthermore, by means of a method according to the invention security attacks may be monitored as they are developing and the method may support in the development of a workable response and handling strategy apparatus. A method according to the invention may also provide the capability of timing and planning responses to security events with maintenance, operations and production schedule to take advantage of planned stops in operations and production or relevant reduced work load periods for the affected and related entities such as specific equipment and/or system.

In a second aspect the invention relates to an apparatus for monitoring an industrial control system, the apparatus comprising:
- one or more internal sources on the industrial control system;
- one or more sources external to the industrial control system;
- an aggregation, correlation and interpretation module for aggregating, correlating and interpreting data collected from internal and external sources so as to monitor the security of the industrial control system.

In one embodiment the internal sources may include one or more of the following sources:
- a sensor;
- an agent; and
- a recording means adapted to record data from instructions, operations, procedures and/or security events locally on the industrial control system.

Internal sources may be sensors deployed in control systems or network, sensors deployed in Supervisory Control and Data Acquisition (SCADA) systems or network, other sensors, agents deployed in the control system or network, agents deployed in SCADA system or network, other agents, operating event record means, security event recording means, and other recording means. Sensors may record conditional information, security events, time and performance parameters, and other quality and security parameters. Agents may be of various types, such as mobile and dynamic agents and may record and assess various modifications, conditional, operational, production and real-time parameters, and events on the various entities such as components and machines in the SCADA system, ICS and other systems, networks, modules, sub-systems or components associated with an ICS. The internal sources may be a part of an internal sources module which may process and combine existing sensors and operational, control, production and security-relevant data from specific entitles and other relevant data into a holistic overview of the security status of specific entities, systems, components or similar or parts therein. The internal sources module may focus on business continuity and on reuse of existing procedures and data gathering and recording apparatus. Data collected from internal sources may be event data from sensors and agents recorded locally on a specific entity, machine, equipment, system, components or parts therein, in contrast to prior art security solutions where data is collected on the network.

Data on operating events, production and process events, operational events, business continuity events, instrumentation and measurement-related events, security risk events, and other events associated with an ICS are received using a plurality of recording means. Recording means may include, but are not limited to, software agents and sensors capturing kernel calls, activity on all layers of the software stack, activities on all layers of the protocol stack, activity of all layers of the machine stack, activities on all layers of the communication stack, activities on all layers of the interface stack, activities executed by applications, software, hardware and similar inside of machinery associated with an ICS. Events may be captured and stored locally on the specific machinery or transferred to an associated recording software and/or entities. Reporting strategies may be based on any combination of business continuity, security and risk perception and acceptance, or operational priorities and parameters.

In embodiment the external sources may comprise one or more of the following sources:
  security blogs and the like;
  security discussion sources and the like;
  databases, such as the National Vulnerability Database (NVD);
  security evaluation and severity information, such as the Common Vulnerability Scoring System (CVSS);
  standards, standardization bodies, security best practices, security agencies, security statistics; and
  information from security software solution providers.

The external sources may be part of an external sources module that combines several hundred sources from the Internet into one threat evaluation. The data from the external sources may be collected into one or more databases that contain information on threats and security attacks gathered from several hundred sources including security blogs, FBI, NVD, antivirus software providers, other security reporting sources and others. The external sources module and the databases may preferably not be directly connected to any controls, operation or production systems due to security reasons. The external sources module and the database may be used to make security predictions based on historical data and information on how different types of security attacks normally propagates, that is, make educated guesses on what is happening before it is possible to see and understand what is actually happening on e.g. a specific computer. This can be compared to weather forecasts where forecasts are made based on a number of parameters, sensors and data, all fed into computational models that amongst other things examine relations between parameters and make interpretations based on historical data and local knowledge and expertise (experience on what might happen tailored for specific geographic locations). References [4-5] give a more detailed overview on interpretation of security-relevant data. Providers of prior art security solutions, such as Symantec, focus on detection rather than forecasting. Forecasting makes it possible to plan what to do ahead of time. An apparatus according to the present invention may use existing security solutions as external sources. An apparatus according to the present invention will give specific forecasts rather than general forecasts. Another advantage with the external sources is that is also makes it possible to put less stress on the operational and production environment in which the industrial control system is used. It enables the use of few, if any, additional and security monitoring specific sensors and as little as possible aggregation of data in the operational and/or production environment. Non-intrusive monitoring and data aggregation may be important in real-time operational and production systems.

In one embodiment the apparatus may further comprise one or more databases, such as one or more of the following:
  a knowledge, recommendations and experience database;
  a past events database; and
  an external events database.

The one or more databases mentioned above in the discussion on the external sources may be several different databases, each of which contains data that may be valuable for correlating data from the internal sources, that is comparing and Interpreting data obtained from the internal sources so as to detect any security-relevant event.

In one embodiment the aggregation, correlation and interpretation module may comprise one or more of the following sub-modules:
  a standard and best practices aggregation and interpretation module;
  an events recording aggregation, correlation and interpretation module;
  an internal sources data aggregation, correlation and interpretation module;
  an external events aggregation, correlation and interpretation module; and
  a configurations module.

Operating events, production and process events, operational events, business continuity events, instrumentation and measurement related events, security risk events, and other events associated with an industrial control system (ICS) may be aggregated using a plurality of aggregation modules. Aggregation may take two or more pieces of information or data regarding security relevant events and combine these into a consistent set of information regarding the recorded events. Recorded events may be on various formats and various abstraction layers. Aggregation may translate and transfer information from one format to another format or from one abstraction layer to another abstraction layer, while maintaining the value of the information in a security evaluation context. The information aggregation algorithms may combine both external and internal sources and events detected in a system with those detected elsewhere to discover potential security-relevant events as early as possible. General solutions according to prior art may not understand specific systems and may generate additional stress on operational and/or production systems. By focusing on understanding specific operational and/or production systems and reusing data and information from operations and/or production monitoring systems, there may be limited need to deploy additional components. Security solution according to prior art provides software or hardware that are placed in the operational and/or production system and networks with additional sensors, equipment and other entities and data being processed and transmitted.

Operating events, production and process events, operational events, business continuity events, instrumentation and measurement-related events, security risk events, and other events associated with an ICS may be correlated using a plurality of correlation modules. Security, risk, performance, real-time parameters, and other quality details, may be correlated and compared using autonomous, semi-autonomous and/or manual apparatus, and a holistic security risk level, status, and details in an ICS are determined. The security risk level determination may include a correlation between a plurality of operating, production, operational, business continuity, instrumentation, measurement, and security risks events, associated with an ICS. The security risk level, status and details may be updated based on an indication of whether the observed events are security risk events or abnormal events for an ICS, specific machinery and equipment associated with an ICS or parts therein.

Operating events, production and process events, operational events, business continuity events, instrumentation and measurement related events, security risk events, and other events associated with an industrial control system (ICS) may be interpreted using a plurality of interpretation modules. Interpretation may be, but is not limited to, comparing recorded events with relevant attack information sources and by step-wise development of attack scenarios from recorded events. Attack information sources may be external sources defined as information recorded and made available outside of a specific industrial control system (ICS).

The configurations module may be used to perform different operations, such as:
 (i) configure monitoring and reporting from agents, sensors and the like;
 (ii) configure features inside of the aggregation, correlation and interpretation module; and
 (iii) establish and update information on the configuration or baseline of an entity Said operations may include configuring hardware versions, firmware versions, operating systems, applications, processes etc. that the entity is comprised of. Said establishing and updating information may include recording, aggregating and correlating events and updating software and/or changing configurations locally on a specific equipment, machine or component. This information may be used to evaluate internal data. Data may be evaluated according to whether what has been reported is within what is considered to be normal operation for the specific entity. For example: if CPU usage is reported to be 70%, and the normal level when the processes that is currently running is 30%, this will be flagged as a potential attack. More data is then evaluated to see if there are other abnormalities that have been observed, like critical processes being stopped, or new processes started, etc. This is the equipment/machine baseline evaluation, which is part of the anomaly detection. An apparatus according to the invention may compare to what is considered normal activity and deduce the anomaly, not the other way around.

In one embodiment the apparatus may further comprise a user interface and/or a warning module adapted to communicate the security status of the industrial control system to a user.

The security evaluation may be linked to an Interface, warning and recommendation module and its main purpose may be to evaluate the severity or risk level posed to an industrial control system or specific entities by the activity being observed and interpreted. The security evaluation and interpretation may collaborate in determining whether abnormal activity has been observed, what type of activity or attack it potentially could be (interpretation) and the severity or risk level it poses to the machine or system (security evaluation). One simple way of reporting a security status on the user interface may be to use green light when everything is ok, orange for uncertain or moderate security risk and red for a critical security risk. The green, orange and red levels may be based on intervals that are configurable to act more or less risk averse or risk taking.

Interfaces may be integrated with existing support solutions and systems. Warnings and recommendation can be issued as emails, on screen, locally at the operational and/or production site, at support centres, on experts cell phone, messenger or similar. The Interfaces, warnings and recommendations may include instructions on actions that should be taken immediately, actions that can wait and scheduling of repair according to operational and/or production plans (maintenance, planned stop in production, etc.). There may be no requirement on real-time network access or real-time network-based updates such as that for anti-virus software. As an apparatus according to the invention will be able to understand the operational and/or production systems it will know what is critical and not critical and may understand when security-relevant events need to be fixed immediately and what may be delayed to e.g. next maintenance stop. Security solutions according to prior art focus on securing the network, computer, etc., whereas an apparatus according to the present invention supports production and operations.

A method and an apparatus according to the invention may be integrated with a control system and may support the control system directly or indirectly in identifying and detecting security-relevant events. The Invention may monitor, record and detect security-relevant events using a combination of pattern, signature, artificial intelligence, behavior analysis, abnormality detection, and other detection devices, and may use data and information from inside and outside of a control system when doing so. A method and an apparatus according to the invention may build response and handling strategies and plans based on a vast amount of sources. The apparatus according to the invention may in one embodiment be semi-autonomous and may be directly correlated to business processes, business continuity strategies and decision processes.

A method and an apparatus according to the present invention may be used in identifying, recording, detecting, monitoring, responding to and reporting security-relevant events in industrial control systems (ICS). Security-relevant events can be any activity or event on an entity such as a machine, hardware or software components, network interfaces, communication interfaces, software interfaces, programmable interfaces, application interfaces, application programmable interfaces, applications, software, software or hardware sensors, software or hardware agents, communication mediums, communication software or other entities external or internal to an ICS affecting the confidentiality, integrity, availability, authenticity, accountability, non-repudiation, and reliability of the ICS, see above for definitions of the different terms Security-relevant events are defined as non-desirable events and can be deemed non-desirable at the point of execution of the event or at any time after event execution. Security-relevant events can be caused by intentional or non-intentional, i.e. accidental, activity on behalf of the machines, humans, software or other subjects external to the industrial control system or any entity internal to the industrial control system.

An internal sources module may process and combine existing sensors and operations—and production—relevant data from production equipment and other relevant data into a holistic overview of the security status of specific systems. The focus is on business continuity and on reuse of existing procedures and data gathering and recording mechanisms. The available data will be used, and only in special cases, where it is considered necessary for business continuity purposes and whenever acceptable from an operational and/or production perspective, additional sensors and data recording means will be placed in the operational and/or production environment and systems.

The aggregation, correlation and interpretation module may provide security interpretation or "security glasses" on operational and production data and other information. Security interpretation is most effective when the interpreter is familiar with the specific operational and/or production environments and systems. An interpreter as used with an apparatus according to the invention may observe activities and operations in the operational and/or production systems and gradually learn to separate normal from abnormal activities. It may get to know the systems like a human gets to know another human's routines by observing actions over time without interacting directly with the person (actions and not reactions). This may be autonomous, semi-autonomous and/or manual. Existing solutions and competitors look for patterns and known abnormal activity and this is the reason why it has taken several years from malware was deployed until it was discovered. Existing solutions are too general and use a one size fits all approach.

An interface, warning and recommendation module may be used with an apparatus according to the invention may issue warnings and recommendations as specific ToDo and repair lists. The underlying risk evaluation may be tailored to specific operational and/or production environments and integrated with the relevant operational, production and/or maintenance schedule. The focus is on business continuity, operations and production and not on security as such. Repairs are scheduled according to the operational, production and/or maintenance procedures. Existing solutions provide general advice and patches, put additional stress on operational and/or production systems and may require real-time network access.

Security systems according to the prior art are looking for security threat and attack patterns and signatures, whereas the present invention is creating security patterns and attack scenarios and looking for deviations from the created patterns and scenarios. Learning how a process should look, and learning how a potential risk could look.

In a third aspect the invention relates to a computer program for executing a method according to any of the method claims 1-8.

BRIEF DESCRIPTION OF THE DRAWINGS

Hereinafter, an example of a non-limiting, preferred embodiment is described and is depicted on the accompanying drawings, where.

DETAILED DESCRIPTION OF THE DRAWINGS

Figure 1:
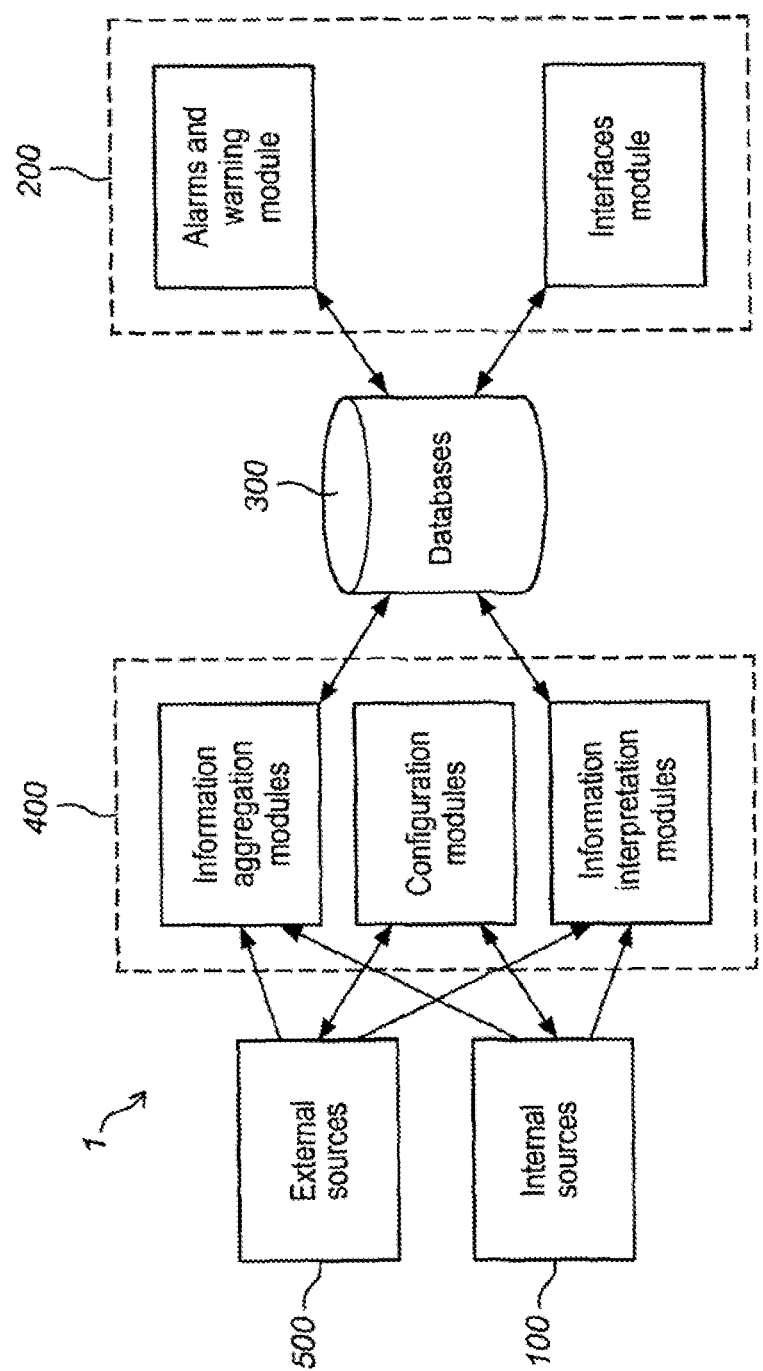
FIG. 1 shows schematically a first embodiment of an apparatus according to the present invention.

In the following the reference numeral 1 indicates an apparatus according to the present invention. The figures are shown schematically and simplified and similar reference numerals refer to identical or similar features.

In FIG. 1 an apparatus 1 according to a first embodiment of the present invention is shown. The apparatus 1 comprises a plurality of internal sources which are part of an internal sources module 100 provided on a not shown industrial control system (ICS). Further, the apparatus 1 comprises a plurality of sources, which are part of an external sources module 500, external to the ICS. Data from both the Internal sources module 100 and the external sources module 500 are collected and processed in an aggregation, correlation and interpretation (ACI) module 400, in FIGS. 2-6 named an aggregation, correlation and interpretation engine. Details on the ACI module 400 is given above in the general description, in the following with reference to FIG. 4 and in references [1-5]. Aggregated and correlated data from the ACI module 400 are stored in databases 300, meaning that collected data from the internal and external sources modules 100 and 500 may be compared to and correlated with data stored in the databases 300. The databases 300 are further communicating with an interface, warning and recommendation module 200.

Figure 2:
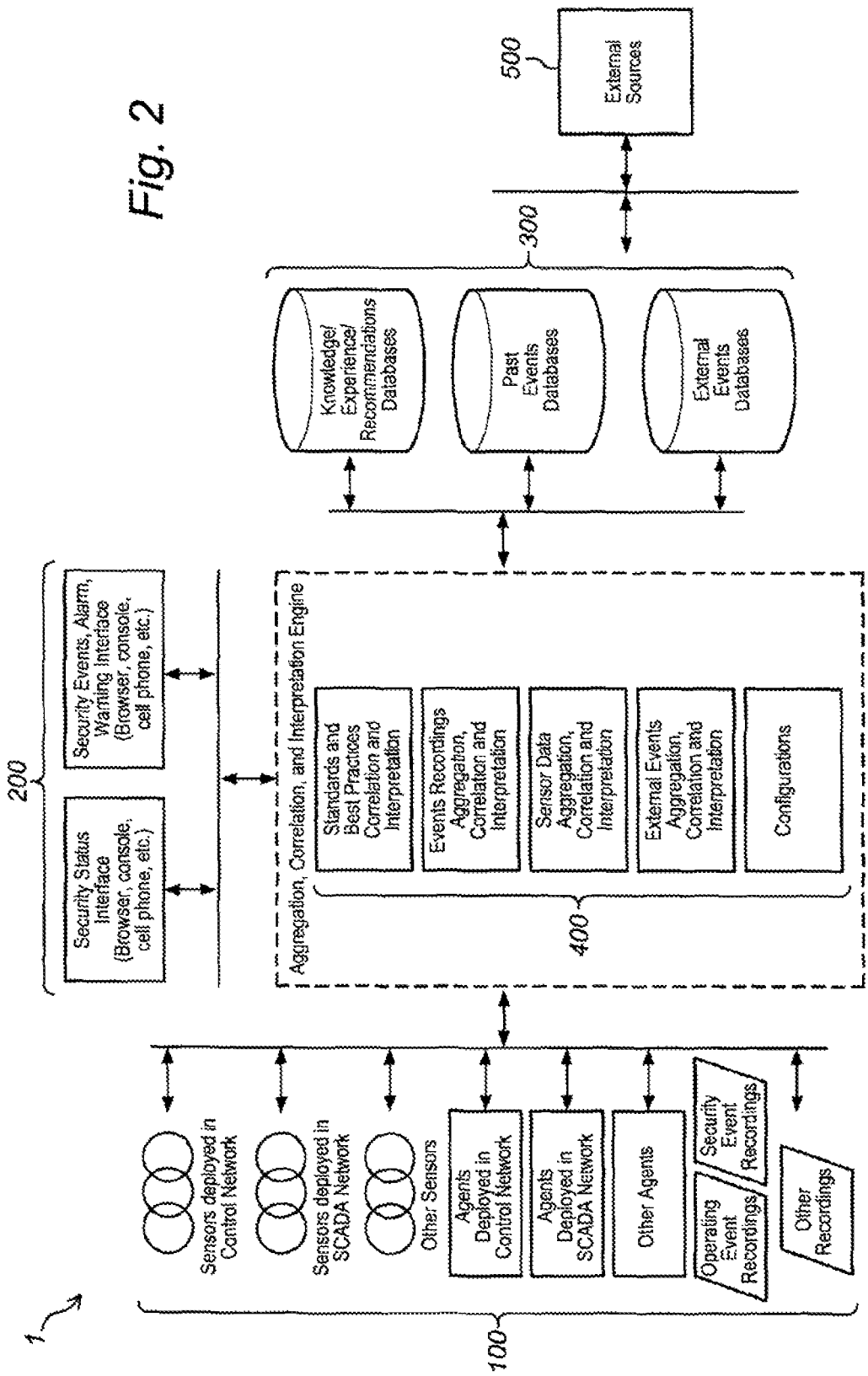
FIG. 2 shows schematically a second embodiment of an apparatus according to the present invention.

FIG. 2 shows a second embodiment of an apparatus 1 according to the present invention. In the shown embodiment, the ACI module 400 is the center of communication with the internal sources module 100, the Interface, warning and recommendation module 200 and the databases 300 communicating directly with the ACI module 400. The external sources module 500 communicates with the ACI module 400 through the databases 300. More detailed views and descriptions of the various modules 100, 200, 300, 400 and 500 are given with reference to FIGS. 3-6 below.

Figure 3:
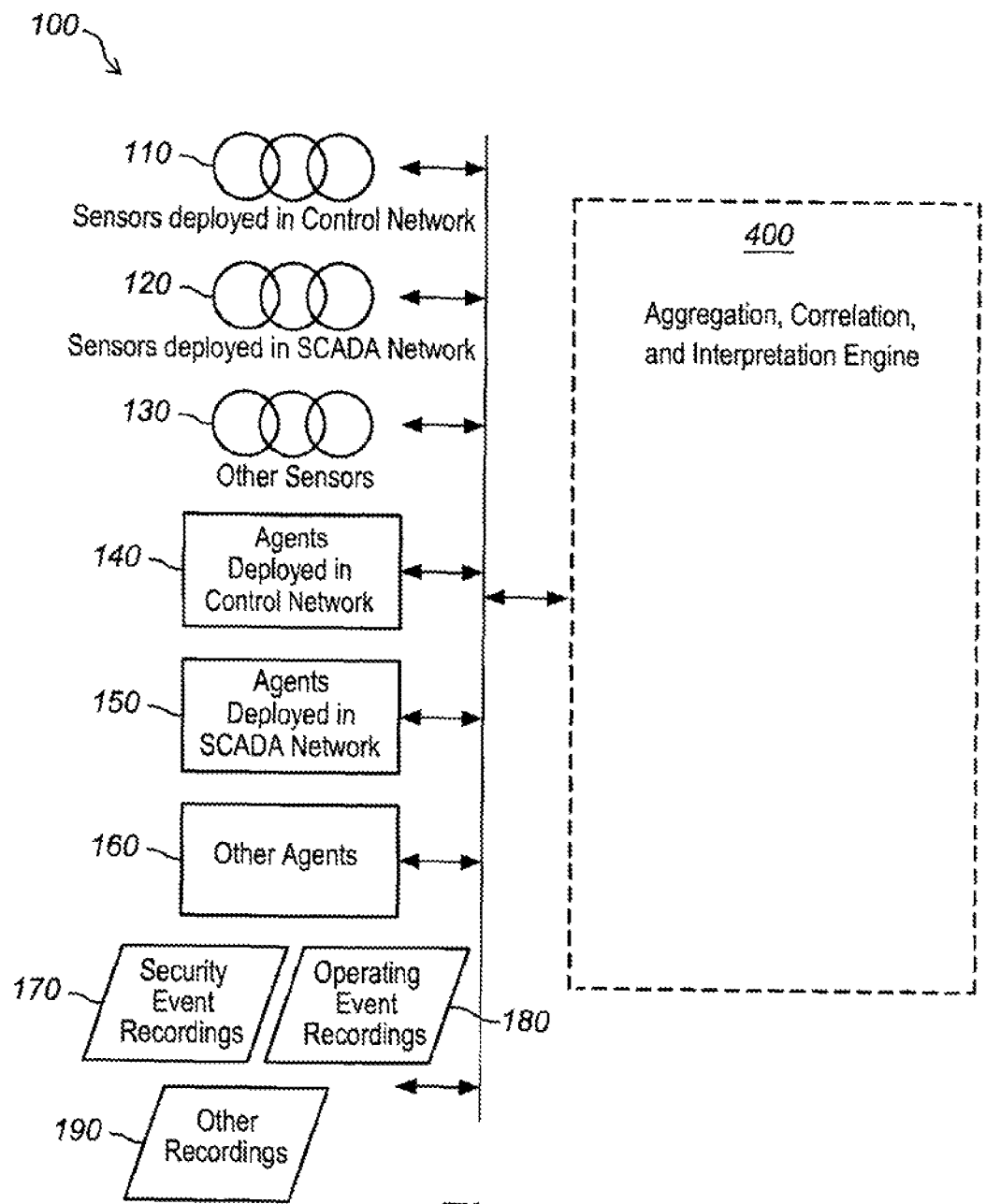
FIGS. 3-6 show schematically details of the apparatus from FIG. 2.

FIG. 3 shows the various features in the internal sources module 100 from which data can be collected in the ACI module 400. Internal sources module 100 may include a variety of sensors, agents and other recording means as described above. In the shown embodiment the internal sources module 100 includes sensors 110 deployed in a control network, sensors 120 deployed in a SCADA network, and other sensors 130. Further, the internal sources module 100 includes agents 140 deployed in the control network, agents 150 deployed in the SCADA network and other agents 160. The internal sources module also includes means for operating events recordings 170, security events recordings 180 and other recordings 190.

Figure 4:
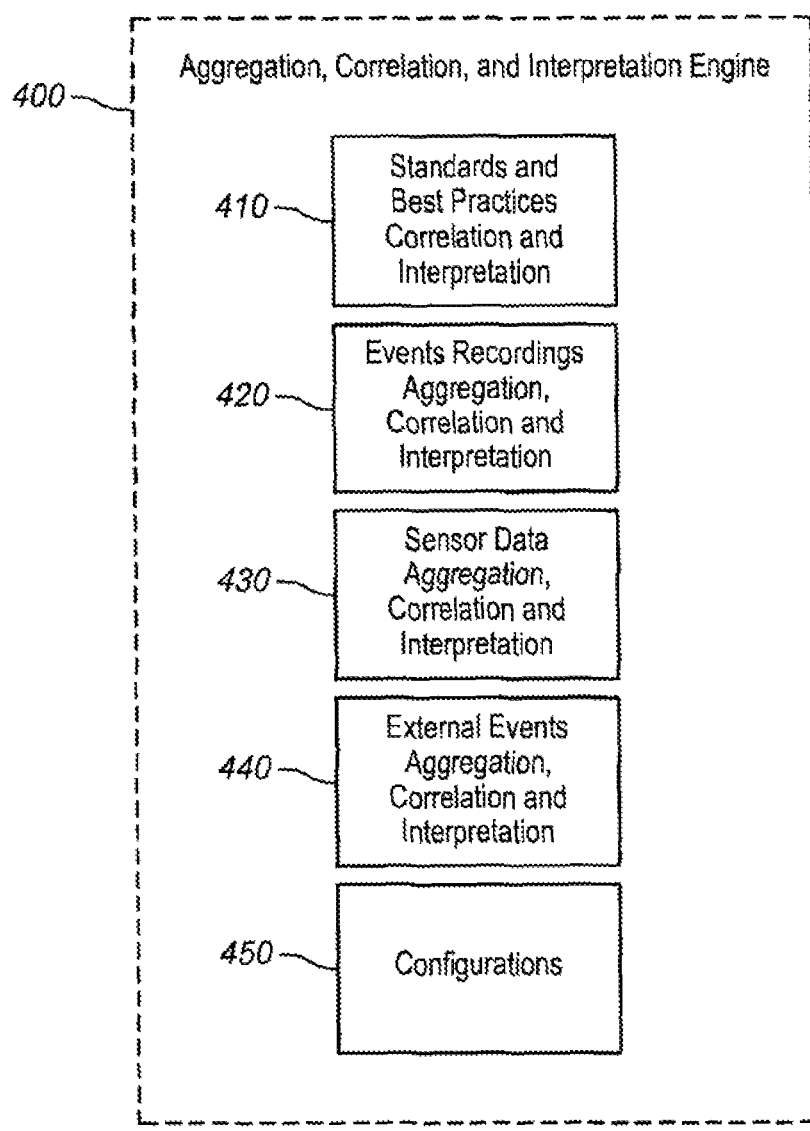

FIG. 4 shows an enlarged view of the ACI module 400. The ACI module 400 may combine data from both external and internal sources and compare events detected in an industrial control system with events detected elsewhere so as to monitor the industrial control system and discover potential security-relevant events early. Security solutions according to prior art may not understand specific systems and may generate additional stress on industrial control systems. By focusing on understanding specific systems and reusing data and information from other relevant systems, there may be a limited need to deploy additional components. In the shown embodiment, the ACI module 400 includes various sub-modules that will be explained in the following. Obtained data is compared to standards and best practices in a standards and best practices correlation and interpretation module 410. Standards may include voluntary and mandatory regulations and domain recommendations relevant for specific industrial control systems. Said standards and best practices correlation and interpretation module 410 may outline boundaries for compliance and specify domain specific and general security requirements and configurations for the specific type of industrial control systems. Best practices are voluntary domain specific and general industrial practice that provide guidelines on security requirements for specific industrial control systems. In an internal events recordings ACI module 420 obtained from the events recording means 170, 180, 190 in the internal sources module 100 are aggregated, correlated and interpreted in view of data from external events, past events and knowledge and experience as stored in the databases 300, and described with reference to FIG. 6 below. Internal events recording aggregation are performed according to the three methods described above: parameterized, layer-wise and cross-layer aggregation. Event recordings correlation is performed according to the four methods described above: across parameters, across layers, across entities in a system and across systems. Correspondingly, a sensor and agent ACI module 430 aggregates, correlates and interprets data collected from the sensors 110, 120, 130 and agents 140, 150, 160 in the internal sources module 100 in view of data from the external events, past events and knowledge and experience as stored in the databases 300. Sensor data aggregation is performed according to the three methods described earlier: parameterized, layer-wise and cross-layer. Sensor data correlation is performed according to the four methods described above: across parameters, across layers, across entities in a system and across systems. An external events ACI module 440 aggregates, correlates and interprets data from the external sources module 500 as obtained through the databases 300. External events are aggregated by means of reformatting data and aligning data of different abstraction layers as described above. Aggregation and correlation can be manual, automated or semi-automated. One possibility for automated aggregation of external data is the aggregation based on identifiers as described earlier. A configurations module 450 may be used to configure data collection from both internal and external sources. The configuration module 450 may for instance be used to configure the recording means 170, 180, 190 in the internal sources module 100. The configuration may change the data set or the manner in which data are recorded from the internal sources module 100, and configuration may similarly change the data set and the evaluation specifications and search criteria for the external sources module 500.

The information interpretation part of the ACI module 400 may provide security events and specific interpretation on various types of data and information. Security interpretation may be most effective when the interpreter is familiar with the specific operational and/or production environments and systems. The interpreter observes activities and operations in the ICS and other relevant systems and may gradually enable identification of abnormal activities. It may or may not interact directly with the systems. A detailed description on the interpretation of data can be found in references [4-5].

Figure 5:
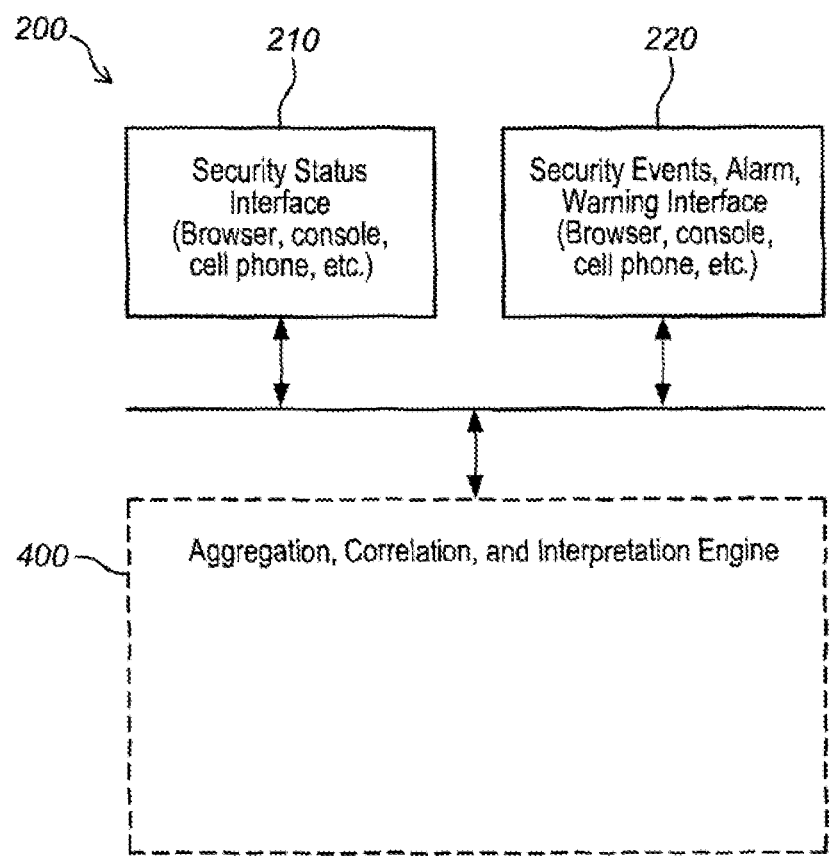
Figure 6:
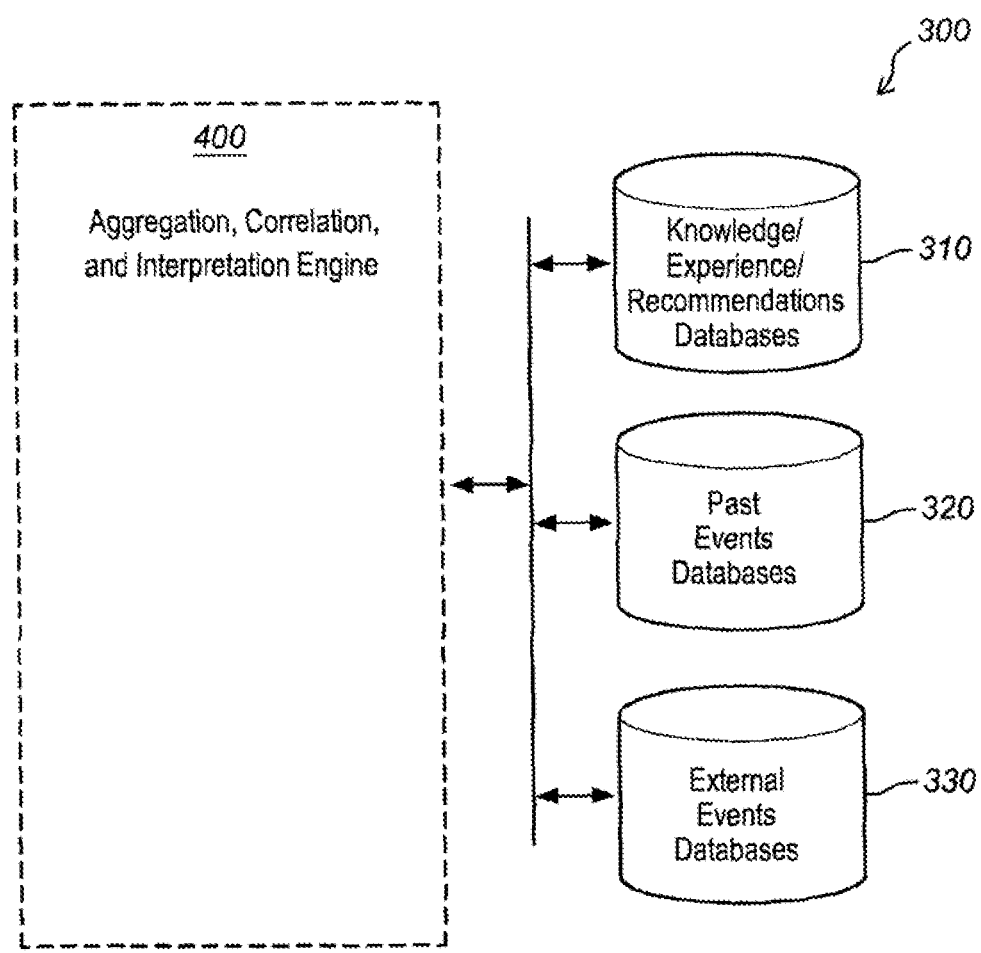

In FIG. 5 an enlarged view of the interface, warning and recommendation module 200 is shown. The module 200 includes two sub-modules; a security status interface 210 and a security events, alarm and warning interface 220. The interface, warning and recommendation module 200 may issue warnings and recommendations as specific repair and maintenance activities. The underlying risk evaluation may be tailored to specific environment and may be integrated with the relevant operational, production and/or maintenance schedule. Warning and alarm levels may be based on thresholds that are based on business continuity and operational, production and/or maintenance procedures. Repairs may be scheduled according to operational, production, and/or maintenance procedures.

The Interfaces 210, 220 may be integrated with existing ICS monitoring, maintenance and support solutions and systems. Warnings and recommendations may be issued as emails, on dedicated and specific computerized or other types of visual media, such as computer screens, on visual equipment local at the operational site, at support centers, on experts cell phone, other types of communication media, or otherwise. The interface, warning and recommendation module 200 may include instructions on actions that should be taken immediately, actions that can wait and may schedule repairs according to operation, business continuity or production plans (maintenance, planned stop in operations, etc.). There may not be requirements on real-time network access or real-time network-based updates such as that for anti-virus software. The security status interface 210 aggregates the security risk situation and status of the various entities, control systems, and/or parts therein. The security status information and details provide a holistic overview and details of the security risk status of specific entities in the ICS, ICS and/or parts therein. The alarms and warnings interface 220 may provide a company specific maintenance plan, controlled repair lists, warnings, alarms or similar. Alarms and warnings may be sent as emails, various types of online and electronic media, accessible from a support center and other locations and in other formats.

Data from the external module 500 are stored in a variety of databases 300, both in raw and aggregated format. The databases 300 contain information on threats and security attacks gathered from several hundred sources including security blogs, FBI, National Vulnerability Database (NVD), antivirus software information and solution providers, other security sources, and other relevant sources. The external sources module 500 and the databases 300 should preferably not be directly connected to the industrial control system, for safety and/or security reasons. The external sources module 500 and databases 300 are used to make security predictions based on historical data, past events, and information on how different types of security attacks may propagate and to make educated guesses regarding the type of behavior and whether the data represents security-relevant events. This feature is denoted security forecasts and are made based on a number of parameters, sensors and data, all fed into computational models that amongst other things examine relations between parameters and make interpretations producing security forecasts based on present, past and historical data and local knowledge and expertise. References [1-3] described in detail how data from various sources can be aggregated to form a holistic threat and security status evaluation, while references [4-5] describe how the aggregated data may be correlated. The external sources module 500 with the databases 300 make it possible to put less stress on the control system environment. It may enable the use of few additional and security monitoring specific sensors and as little as possible aggregation of data in the operational or production environment. The databases 300 include the following sub-databases: a knowledge, experience and recommendations database 310, a past events database 320 and an external events database 330. The databases 310, 320, 330 contain data both in raw format, obtained directly from the external sources module, and data which has been treated in the ACI module 400.

Figure 7:
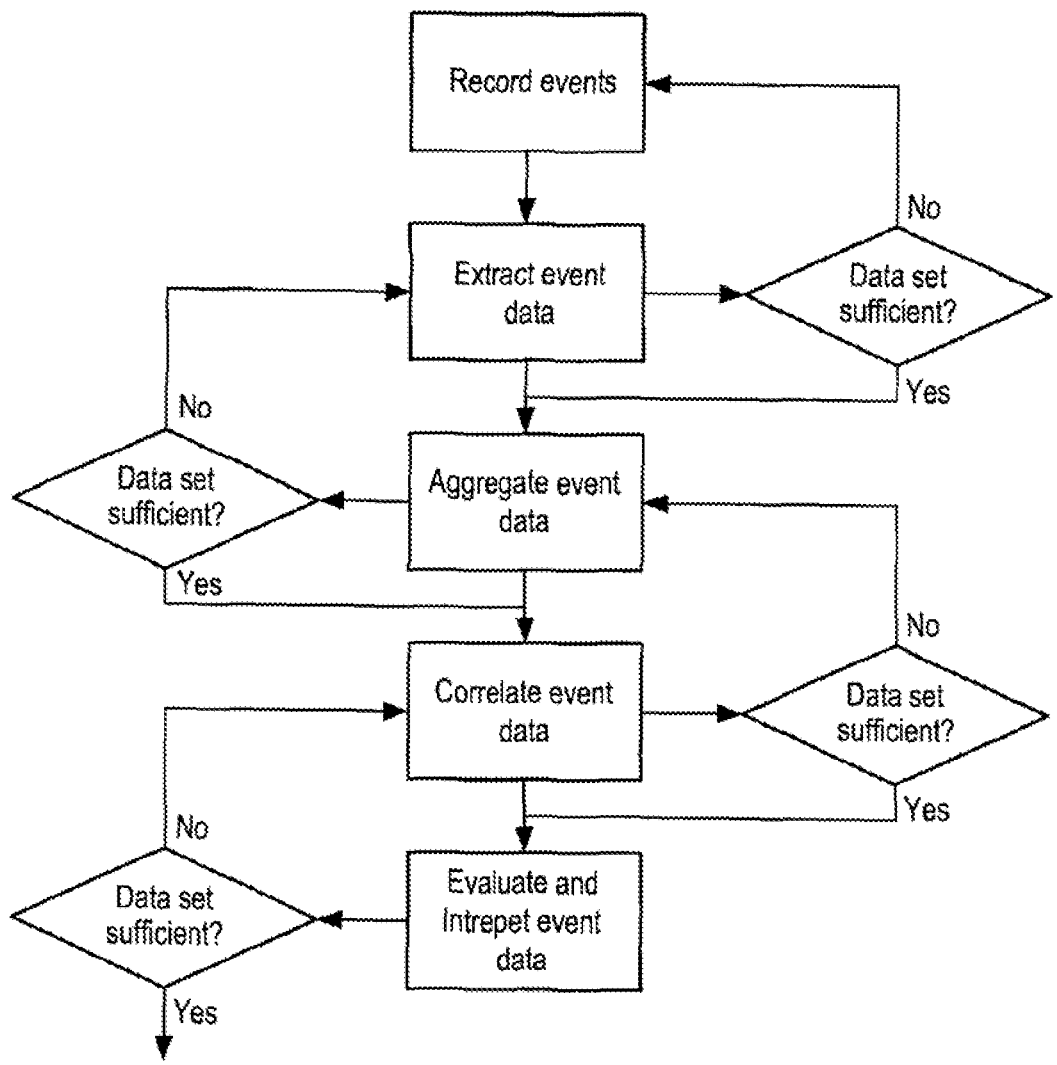
FIG. 7 shows, in a flow diagram, a first part of a method according to present invention.

In FIG. 7 an exemplary method that may be used for recording and analyzing security events data and other data is the following: Firstly, events are recorded using sensors and agents in the control system, and from the external sources and relevant databases. Secondly, event data are extracted and checked for completeness and so whether the data set is sufficient for the specific analysis and for fulfilling analysis requirements. In case the data set is sufficient, the event data is aggregated as described above and in references [1-3]. In case the data set is identified as not sufficient, additional events are recorded and gathered. In case the data set, after aggregation, is sufficient, data are correlated across information sources, and according to specific configurations and purposes. In cases where the data set, after aggregation, is not sufficient, more data is gathered or additional data aggregation is performed. The data set is evaluated and security risks status is determined, along with various interpretations of the data for security events assessment and reporting purposes as described above and in references [4-5].

Figure 8:
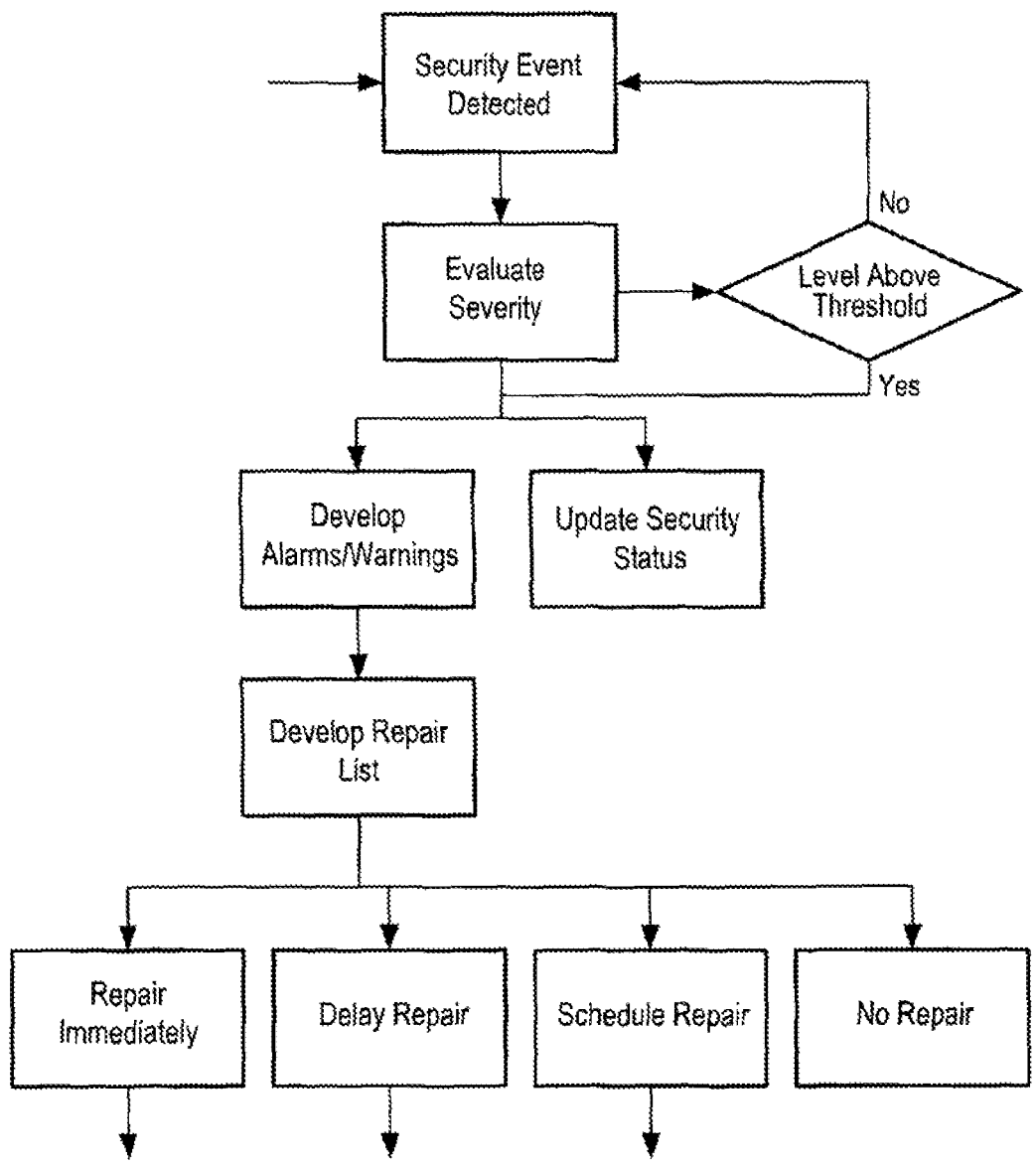
FIG. 8 shows, in a flow diagram, a second part of a method according to the present invention.

In FIG. 8 an exemplary method that might be used for reporting of security status, and generating warnings and alarms regarding the security risk situation for specific parts and entities of the Industrial control system (ICS) and the Industrial control system (ICS) as a whole is shown: Whenever security events are detected, the severity of such events are evaluated and determined as described above. The severity may be evaluated against a pre-defined or on-the-spot threshold. This threshold may be company specific and may also be location and installation specific. In case the severity level is identified to be above the threshold, alarms and warnings are developed and the security status of the ICS and/or its specific entities is updated. The alarms and warnings may be sent as emails, as messages of various kinds, or be viewed or reported in a web-form or otherwise viewed in various manners as described above, depending on what is appropriate and efficient for the specific context and environment. Alarms and warnings may refer to security events that need immediate attention and repair or may refer to events that can be scheduled for repair according to some repair schedule or maintenance procedure and schedule or according to other scheduling parameters. The repair alternatives may be: Repair immediately, delay repair, schedule repair or no repair.

1. Siv Hilde Houmb, Indrakshi Ray, Indrajit Ray, and Sudip Chakraborty. Trust-Based Security Level Evaluation Using Bayesian Belief Networks. In: M. L. Gavrilova et al. (Eds.): *Trans. on Comput. Sci. X, LNCS* 6340, pages 154-186 (2010). Springer-Verlag Berlin Heidelberg 2010.
2. Siv Hilde Houmb, Sudip Chakraborty, Indrakshi Ray, Indrajit Ray. Using Trust-Based Information Aggregation for Predicting Security Level of Systems. In: *DBSec* 2010, pages 241-256, 2010.
3. Siv Hilde Houmb, Virginia N. L. Franqueira, Erlend Agoy Engum. *Quantifying security risk level from CVSS estimates of frequency and impact*. Journal of Systems and Software 83(9): 1622-1634 (2010).
4. Siv Hilde Houmb, Virginia N. L. Franqueira and Erlend Agøy Engum. Estimating Impact and Frequency of Risks to Safety and Mission Critical Systems Using CVSS. In: *ISSRE* 2008 *Supplemental Proceedings: 1st Workshop on Dependable Software Engineering*, 11 Nov. 2008, Seattle, US, 6 pages, IEEE CS Conference Proceedings, IEEE Computer Society Press, Seattle, US, November 2008. ISBN 978-1-4244-3417-6.
5. Ralph Langer, To Kill a Centrifuge, A Technical analysis of What Stuxnet's Creators Tried to Achieve, http://www.langner.com/en/wp-content/uploads/2013/11/To-kill-a-centrifuge.pdf

The invention claimed is:

1. A method for monitoring an industrial control system, the method comprising:
   collecting data from one or more external sources that are external to the industrial control system;
   collecting data from one or more internal sources on the industrial control system, the data collected from the one or more internal sources and the one or more external sources being collectively referred to as collected data;
   aggregating the collected data to generate aggregated data;
   correlating the aggregated data by analyzing and interpreting the aggregated data in view of historical aggregated data that was previously collected and aggregated so as to monitor the security of the industrial control system;
   wherein the step of collecting data from the one or more internal sources on the industrial control system comprises collecting data from one or more of:
   a sensor, an agent implemented as a computer program for recording and assessing parameters and events, and a recording means adapted to record data from instructions, operations, procedures or security events locally on the industrial control system;
   wherein the step of collecting the data from the one or more sources external to the industrial control system comprises collecting data from one or more of:
   security blogs, security discussion sources, databases for providing information on threats and security attacks, security evaluation and severity information comprising at least one of Common Vulnerability Scoring System (CVSS), standards, standardization bodies, security best practices, security agencies, and information from security software solution providers; and
   wherein the step of correlating the aggregated data comprises, for at least two parameters of the collected data, generating a first graph of one of the at least two parameters during a period and a second graph of data from a critical process during the period, correlating the first graph and the second graph so as to generate a correlation graph, and correlating the correlation graph corresponding to each of the at least two parameters so as to generate an interval graph for forecasting security events within the industrial control system based on correlations between data from the one or more internal sources and the one or more external sources over time.

2. The method according to claim 1, wherein the step of aggregating the collected data comprises aggregating the data of the one or more said internal sources using one or more of:
   parameterized aggregation, layer-wise aggregation, and cross-layer aggregation.

3. The method according to claim 1, wherein the step of aggregating the collected data comprises aggregating the data from the one or more external sources by performing one or more of:
reformatting the data collected from the one or more external sources; and
reformatting the data collected from the one or more external sources so as to generate reformatted data and aggregating the reformatted data into a database.

4. The method according to claim 1, wherein the step of correlating the aggregated data comprises one or more of:
correlating across parameters, correlating across layers, correlating across entities in a system, and correlating across systems.

5. The method according to claim 1, wherein the step of correlating the aggregated data comprises the step of determining a security risk from a detected security event by performing one or more of:
evaluating the aggregated data by comparing to a predefined threshold value, evaluating the aggregated data by comparing to a relevant installation baseline, performance baseline, or entity configuration baseline, such as a machine or equipment baseline, to identify abnormal activity, evaluating the aggregated data by comparing to a past events database, evaluating the aggregated data by comparing to a knowledge, experience and recommendations database obtained from a collection of standards and best practices and from the one or more external sources, and evaluating the aggregated data by comparing to security events reports from the one or more external and internal sources.

6. The method according to claim 1, wherein the method further comprises the step of reacting to a security risk by performing one or more of:
repairing immediately, scheduling a repair, delaying the repair, and doing nothing.

7. An apparatus for monitoring an industrial control system, the apparatus comprising:
an internal sources module executable to collect data from one or more internal sources on the industrial control system;
an external sources module executable to collect data from one or more external sources that are external to the industrial control system, wherein the data from the one or more internal sources and the one or more external sources are collectively referred to as collected data;
an aggregation, correlation and interpretation module executable for aggregating, correlating and interpreting the data from the one or more internal and the one or more external sources so as to monitor the security of the industrial control system, the aggregating, correlating and interpretation module generating aggregation data and correlation data;
wherein the one or more internal sources comprise one or more of:
a sensor, an agent implemented as a computer program for recording and assessing parameters and events, and a recording means adapted to record data from, instructions, operations, procedures or security events locally on the industrial control system;
wherein the one or more external sources comprise one or more of:
security blogs, security discussion source, databases for providing information on threats and security attacks, security evaluation and severity information comprising at least one of Common Vulnerability Scoring System (CVSS), standards, standardization bodies, security best practices, security agencies, security statistics, and information from security software solution providers; and
a computer database configured to store the aggregation data and the correlation data;
wherein the aggregation, correlation and interpretation module is adapted to generate, for at least two parameters of the collected data, a first graph of one of the at least two parameters during a period and a second graph of data from a critical process during the period, to correlate the first graph and the second graph so as to generate a correlation graph, and to correlate the correlation graph corresponding to each of the at least two parameters so as to generate an interval graph for forecasting security events within the industrial control system based on correlations between data from the one or more internal sources and the one or more external sources over time.

8. The apparatus according to claim 7, wherein the apparatus further comprises one or more databases that comprise one or more of:
a knowledge, recommendations and experience database, a past events database, and an external events database.

9. The apparatus according to claim 7, wherein the aggregation, correlation and interpretation module comprises one or more of: a standard and best practices aggregation and interpretation module, an events recording aggregation, correlation and interpretation module, a sensor and agent data aggregation, correlation and interpretation module, an external events aggregation, correlation and interpretation module, and a configurations module.

10. The apparatus according to claim 7, wherein the apparatus further comprises a security user interface or an alarm and warning module adapted to communicate the security status of the industrial control system to a user.

11. A non-transient computer readable medium comprising a computer program for monitoring an industrial control system, wherein the computer program when executed by a processor is configured to:
collect within an external sources module data from one or more external sources that are external to the industrial control system;
collect within an internal sources module data from one or more internal sources on the industrial control system, the data collected from the one or more internal sources and the one or more external sources being collectively referred to as collected data;
aggregate the collected data within an aggregation correlation and interpretation module to generate aggregated data;
correlate the aggregated data within the aggregation, correlation and interpretation module by analyzing and interpreting the aggregated data in view of historical aggregated data that was previously collected and aggregated from a computer database so as to monitor the security of the industrial control system;
store the aggregated data and the correlated data generated by the aggregation, correlation and interpretation module in the computer database;
wherein collecting the data from the one or more internal sources on the industrial control system comprises collecting data from one or more of:
a sensor, an agent configured to record and assess parameters and events, and a recording means adapted to record data from instructions, operations, procedures or security events locally on the industrial control system;

wherein the step of collecting the data from the one or more sources external to the industrial control system comprises collecting data from one or more of:

security blogs, security discussion sources, databases for providing information on threats and security attacks, security evaluation and severity information comprising at least one of Common Vulnerability Scoring System (CVSS), standards, standardization bodies, security best practices, security agencies, and information from security software solution providers; and wherein the computer program correlates the aggregated data by, for at least two parameters of the collected data, generating a first graph of one of the at least two parameters during a period and a second graph of data from a critical process during the period, correlating the first graph and the second graph so as to generate a correlation graph, and correlating the correlation graph corresponding to each of the at least two parameters so as to generate an interval graph for forecasting security events within the industrial control system based on correlations between data from the one or more internal sources and the one or more external sources over time.

* * * * *